Patented Apr. 3, 1951

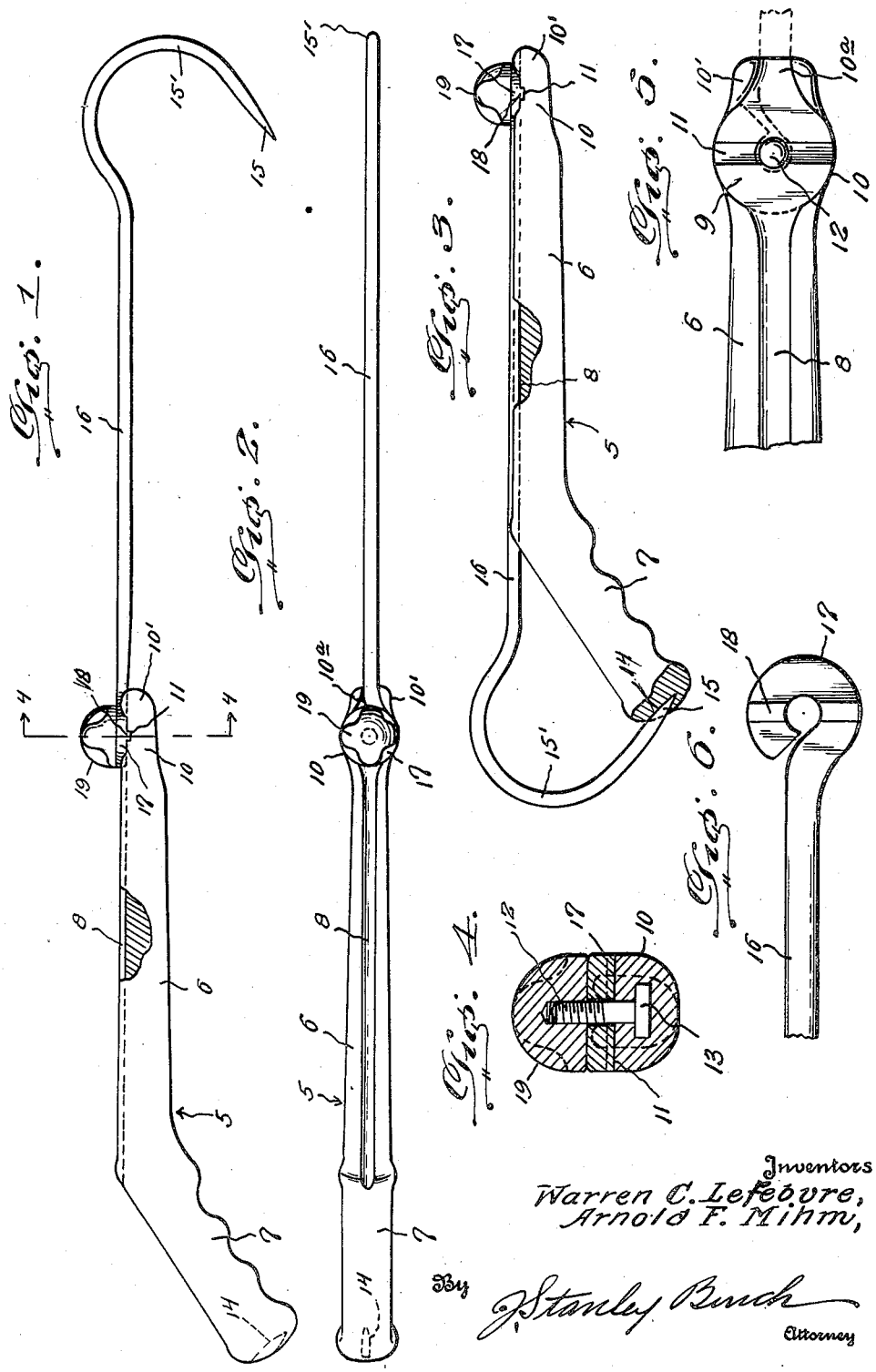

2,547,273

UNITED STATES PATENT OFFICE 2,547,273

FOLDING GAFF HOOK

Warren C. Le Febvre and Arnold Mihm,
Hibbing, Minn.

Application September 15, 1947, Serial No. 773,972

2 Claims. (Cl. 294—26)

1

This invention relates to an improved folding gaff hook of the type embodying a handle member, and a hook member pivoted thereto, means being provided to rigidly retain the hook member in extended and folded positions and to cover the pointed end of the bill of the hook member when folded.

The primary object of the present invention is to provide a simple and efficient gaff hook of the above kind which is easy to use and inexpensive to manufacture.

Other objects and features of the invention will become apparent from the following description when considered with the accompanying drawing, in which:

Figure 1 is a side elevational view, partly in section, of a gaff hook constructed in accordance with the present invention, the hook member being in extended position.

Figure 2 is a top plan view thereof.

Figure 3 is a view similar to Fig. 1, with the hook member in folded position.

Figure 4 is an enlarged transverse section taken on line 4—4 of Figure 1.

Figure 5 is an enlarged top plan view of the end portion of the handle member to which the hook member is pivoted.

Figure 6 is an enlarged bottom plan view of the end portion of the hook member which is pivoted to the handle member.

Referring in detail to the drawing, 5 indicates a pistol-grip type of handle member including a shank portion 6 and a hand grip portion 7. The shank portion 6 has a central longitudinal groove 8 in the top thereof that extends from the hand grip portion to the flat upper face 9 of a widened part 10 near the terminal end portion 10' of said shank portion. The part 10 has a transverse diametric groove 11 in its flat upper face, and is provided with an upwardly projecting axial bolt stem 12 whose head 13 and adjacent stem portion are solidly embedded or secured in the part 10. At its butt end, the hand grip portion 7 has a recess 14 of a size to snugly receive the pointed end 15 of the bill 15' of the hook member 16. Terminal 10' has a groove 10a alined with the groove 8.

Hook member 16 is formed at the end opposite its bill with an eye 17 to receive the bolt stem 12, and the eye 17 is provided across one face with a transverse diametric rib 18 for snug reception in the groove 11. The arrangement is such that the hook may be arranged in extended position as shown in Figures 1 and 2, with the rib 18 seated in groove 11 and the shank of hook member 16 extended forwardly in the groove 10a of terminal end portion 10'. A nut 19 is threaded onto bolt stem 12 above the eye 17 to firmly secure the hook member in the extended position. Also, the nut 19 may be loosened and the hook member turned about the bolt stem 12 to the folded position of Figure 3. In this folded position the shank of the hook member is seated in

2 groove 8, the rib 18 is seated in groove 11, and the pointed end 15 of the bill 15' is seated in recess 14. By tightening the nut 19, the hook member may be firmly secured in this folded position and the bill of the hook member is covered to prevent it from causing injury.

From the foregoing description, the nature and advantages of the invention will be apparent. Minor changes in details of construction are contemplated within the scope of the invention as claimed.

What we claim is:

1. A folding gaff hook comprising a pistol-grip handle member including shank and hand grip portions, said shank portion having a flat-faced part near its terminal end portion and being formed with a longitudinal groove in the top thereof from the hand grip portion to the flat face of said part, and in the top of said terminal end portion, said part having a central upwardly projecting bolt stem and being formed with a transverse diametric groove, said handle member having a recess in the butt end thereof, a hook member including a shank having an eye at one end and a pointed bill at the other end, said eye having a transverse diametric rib on one face thereof to seat in said transverse groove when the hook member is in folded and extended positions with the shank of said hook member respectively seated in the groove of the shank member and in the groove of the terminal end portion, the pointed end of the bill of said hook member being engageable in said recess when said hook member is in the folded position, and a nut threaded on said bolt stem to releasably secure the hook member in each of said positions.

2. A folding gaff hook comprising a pistol-grip handle member including shank and hand-grip portions, the shank portion having an upwardly projecting bolt stem near its terminal end portion, a hook member having an eye at one end pivotally engaged with said bolt stem for swinging movement between folded and extended positions, and a nut threaded on said bolt stem to secure the hook member in either of said positions, said shank portion having longitudinal grooves in the top thereof for reception of the shank of said hook member to positively hold the hook member in either of said positions when the nut is tightened.

WARREN C. LE FEBVRE.
ARNOLD MIHM.

REFERENCES CITED

The following references are of record in the file of this patent:

UNITED STATES PATENTS

| Number | Name | Date |
|---|---|---|
| 291,972 | Atwood | Jan. 15, 1884 |
| 2,052,705 | Glass | Sept. 1, 1936 |
| 2,155,913 | Thompson et al. | Apr. 25, 1939 |
| 2,214,660 | Darling | Sept. 10, 1940 |